(12) United States Patent
Huang

(10) Patent No.: US 11,070,047 B2
(45) Date of Patent: Jul. 20, 2021

(54) OVERCURRENT PROTECTION DRIVING CIRCUIT AND DISPLAY APPARATUS

(71) Applicants: Chongqing HKC Optoelectronics Technology Co., Ltd., Chongqing (CN); HKC Corporation Limited, Guangdong (CN)

(72) Inventor: Xiaoyu Huang, Chongqing (CN)

(73) Assignees: Chongqing HKC Optoelectronics Technology Co., Ltd., Chongqing (CN); HKC Corporation Limited, Shenzhen (CN)

( * ) Notice: Subject to any disclaimer, the term of this patent is extended or adjusted under 35 U.S.C. 154(b) by 163 days.

(21) Appl. No.: 16/386,287

(22) Filed: Apr. 17, 2019

(65) Prior Publication Data

US 2020/0076182 A1    Mar. 5, 2020

Related U.S. Application Data

(63) Continuation of application No. PCT/CN2018/116667, filed on Nov. 21, 2018.

(30) Foreign Application Priority Data

Sep. 3, 2018 (CN) .......................... 201811028669.6

(51) Int. Cl.
  *H02H 3/087*      (2006.01)
  *G02F 1/1333*    (2006.01)
(52) U.S. Cl.
  CPC ........... *H02H 3/087* (2013.01); *G02F 1/1333* (2013.01)

(58) Field of Classification Search
  CPC .. H02H 3/00; H02H 3/02; H02H 3/08; H02H 3/081; H02H 3/087; H02H 3/10;
  (Continued)

(56) References Cited

U.S. PATENT DOCUMENTS

| 2001/0017535 A1* | 8/2001 | Inaba ...................... G05F 1/575 323/274 |
| 2004/0263139 A1* | 12/2004 | Goto ...................... H02M 3/156 323/282 |

(Continued)

FOREIGN PATENT DOCUMENTS

| CN | 102780199 A | 11/2012 |
| CN | 202617058 U | 12/2012 |

(Continued)

*Primary Examiner* — Thienvu V Tran
*Assistant Examiner* — Carlos O Rivera-Perez

(57) ABSTRACT

Disclosed are an overcurrent protection driving circuit and a display apparatus. The overcurrent protection driving circuit includes a power supply circuit, a current feedback circuit, a current detection circuit, a level output circuit and a switching circuit, the power supply circuit outputs a direct current voltage to a display panel via the switching circuit, the current feedback circuit converts a voltage signal transmitted by the power supply circuit to the display panel to a current signal and feeds the current signal back to the current detection circuit, and when a current value corresponding to the current signal is smaller than an overcurrent protection current threshold value, the current detection circuit outputs a first level signal to control the switching-off of the switching circuit to cut off the supply of power from the power supply circuit to the display panel.

18 Claims, 3 Drawing Sheets

(58) Field of Classification Search
CPC ......... H02H 3/105; G02F 1/00; G02F 1/1333;
G02F 1/1345; G02F 1/13454; G09G 3/00;
G09G 3/20; G09G 3/2096; G09G 3/32;
G09G 3/3208; G09G 3/34; G09G 3/36;
G09G 3/3611; G09G 3/3648; G09G
3/3696; G09G 2330/00; G09G 2330/02;
G09G 2330/028; G09G 2330/021; G09G
2330/04; G09G 2330/045; H02M 1/32;
H02M 1/36; H03K 17/08; H03K 17/082;
H03K 17/0822
USPC ............. 361/54–57, 78, 79, 86, 87, 92–102;
323/276, 278, 282–285; 363/50–58;
345/204, 211–213, 52
See application file for complete search history.

(56) References Cited

U.S. PATENT DOCUMENTS

| | | | |
|---|---|---|---|
| 2009/0015977 A1 | 1/2009 | Patel | |
| 2016/0293107 A1* | 10/2016 | Jeong | G09G 3/3233 |
| 2017/0261800 A1* | 9/2017 | Zhang | G09G 3/2096 |
| 2018/0308448 A1* | 10/2018 | Lee | G09G 3/3696 |
| 2019/0260290 A1* | 8/2019 | Maejima | H02M 3/156 |

FOREIGN PATENT DOCUMENTS

| | | |
|---|---|---|
| CN | 103200732 A | 7/2013 |
| CN | 204391740 U | 6/2015 |
| CN | 105741777 A | 7/2016 |
| CN | 206164901 U | 5/2017 |
| CN | 107528288 A | 12/2017 |
| KR | 100843412 B1 | 7/2008 |

\* cited by examiner

OVERCURRENT PROTECTION DRIVING CIRCUIT AND DISPLAY APPARATUS

CROSS REFERENCE TO RELATED APPLICATIONS

The present application is a Continuation Application of PCT Application No. PCT/CN2018/116667 filed on Nov. 21, 2018, which claims the benefit of Chinese Patent Application No. 201811028669.6, filed on Sep. 3, 2018, which is incorporated herein by reference in its entirety.

FIELD OF THE DISCLOSURE

The present disclosure relates to the field of display technologies, and in particular, to an overcurrent protection driving circuit and a display apparatus.

BACKGROUND OF THE DISCLOSURE

As one of the main types of existing display panels, thin Film Transistor Liquid Crystal Displays (TFT-LCDs) have become an important display platform for modern IT products and video products.

The main drive principle of TFT-LCD is that: a system board connects a compressed R/G/B signal, a control signal and a power supply with a connector on a PCB through wires, and data is processed by a Timing Controller (TCON) Integrated Circuit (IC) on the PCB and then connected with a display panel through a Source-Chip on Film (S-COF) and a Gate-Chip on Film (G-COF), thereby allowing the display panel to obtain a working power supply and a display signal. However, because of a defect in manufacture procedures of the panel or a short circuit caused by foreign matters, a short circuit may occur in the display panel, in the case of a short circuit, an overcurrent is generated which causes an irreversible damage to a drive circuit or the display panel.

SUMMARY OF THE DISCLOSURE

A main objective of the present disclosure is to provide an overcurrent protection driving circuit to address the problem that the generation of a large current when a short circuit occurs in a display panel causes an irreversible damage to a drive circuit or the display panel.

To realize the objective, an overcurrent protection driving circuit is provided, including:

a power supply circuit configured to output a direct current voltage;

a switching circuit connected in series between the power supply circuit and a display panel and configured to output or cease outputting the direct current voltage to the display panel according to a switch control signal;

a current feedback circuit configured to convert a voltage signal transmitted from the power supply circuit to the display panel to a current signal and feed the current signal back to a current detection circuit;

the current detection circuit configured to detect a magnitude of the current signal and output a first level signal when a current value corresponding to the current signal is smaller than an overcurrent protection current threshold value; and a level output circuit configured to control the switching-off of the switching circuit according to the first level signal to cut off the supply of power from the power supply circuit to the display panel.

Optionally, a power output terminal of the power supply circuit, a power input terminal of the switching circuit and a signal input terminal of the current feedback circuit are interconnected, a power output terminal of the switching circuit is connected with a power input terminal of the display panel, a signal output terminal of the current feedback circuit is connected with a signal input terminal of the current detection circuit, a signal output terminal of the current detection circuit is connected with a signal output terminal of the level output circuit, and the signal output terminal of the level output circuit is connected with a controlled terminal of the switching circuit.

Optionally, a voltage signal of the current detection circuit and the current signal are in a positive feedback relationship.

Optionally, the switching circuit is in a switched-off state when the power supply circuit is initially powered on.

Optionally, the level output circuit includes a signal latching circuit and a level conversion circuit, a first signal input terminal of the signal latching circuit is connected with the signal output terminal of the current detection circuit, a signal output terminal of the signal latching circuit is connected with a signal input terminal of the level conversion circuit, and a signal output terminal of the level conversion circuit, a control terminal of the switching circuit and a second signal input terminal of the signal latching circuit are interconnected;

the signal latching circuit is configured to output a level signal of the second signal input terminal to the level conversion circuit when the current detection circuit outputs the first level signal; and the level conversion circuit is configured to receive a level signal output by the signal latching circuit and output a reverse level signal to the switching circuit and the second signal input terminal of the signal latching circuit.

Optionally, the signal latching circuit includes a D flip-flop, a clock input terminal of the D flip-flop is connected with the signal output terminal of the current detection circuit, a data input terminal of the D flip-flop, the signal output terminal of the level conversion circuit and the control terminal of the switching circuit are interconnected, and a data output terminal of the D flip-flop is connected with the signal input terminal of the level conversion circuit.

Optionally, the level conversion circuit includes a direct current power supply, a first MOS transistor, a second MOS transistor and a second resistor, the first MOS transistor is a PMOS transistor, and the second MOS transistor is an NMOS transistor;

a gate electrode of the first MOS transistor and that of the second MOS transistor are both connected with the signal output terminal of the signal latching circuit, a source electrode of the first MOS transistor is connected with a power output terminal of the direct current power supply, a drain electrode of the first MOS transistor, that of the second MOS transistor and a first terminal of the second resistor are interconnected, and a source electrode of the second MOS transistor is connected with a second terminal of the second resistor.

Optionally, the current feedback circuit includes a third MOS transistor, which is an NMOS transistor;

a gate electrode of the third MOS transistor is connected with the power output terminal of the power supply circuit, a drain electrode of the third MOS transistor is connected with the signal input terminal of the current detection circuit, and a source electrode of the third MOS transistor is grounded.

Optionally, the switching circuit includes a fourth MOS transistor, which is an NMOS transistor;

a drain electrode of the fourth MOS transistor is connected with the power output terminal of the power supply circuit, a gate electrode of the fourth MOS transistor is connected with the signal output terminal of the level output circuit, and a source electrode of the fourth MOS transistor is connected with the power input terminal of the display panel.

Optionally, the power supply circuit is a power supply circuit with constant power.

The present disclosure further provides an overcurrent protection driving circuit, including:

a power supply circuit configured to output a direct current voltage to a display panel via a switching circuit;

a third MOS transistor, a D flip-flop, a direct current power supply, a first MOS transistor, a second MOS transistor and a second resistor, wherein a gate electrode of the third MOS transistor is connected with a power output terminal of the power supply circuit, a drain electrode of the third MOS transistor is connected with a signal input terminal of a current detection circuit, and a source electrode of the third MOS transistor is grounded;

a clock input terminal of the D flip-flop is connected with a signal output terminal of the current detection circuit, a data input terminal of the D flip-flop, a drain electrode of the first MOS transistor, a drain electrode of the second MOS transistor, a first terminal of the second resistor and a controlled terminal of the switching circuit are interconnected, a data output terminal of the D flip-flop, a gate electrode of the first MOS transistor and a gate electrode of the second MOS transistor are interconnected, a source electrode of the first MOS transistor is connected with a power output terminal of the direct current power supply, and a source electrode of the second MOS transistor is connected with a second terminal of the second resistor;

the third MOS transistor is configured to convert a voltage signal transmitted by the power supply circuit to the display panel to a current signal and feed the current signal back to the current detection circuit; and the current detection circuit configured to detect a magnitude of the current signal and output, when a current value corresponding to the current signal is smaller than an overcurrent protection current threshold value, a first level signal to the clock input terminal of the D flip-flop to trigger the D flip-flop to output a triggering signal to control the switching-off of the first MOS transistor and the switching-on of the second MOS transistor, wherein the second MOS transistor outputs a grounding signal to control the switching-off of the switching circuit to cut off a power supply conveyed by the power supply circuit to the display panel.

The present disclosure further provides a display apparatus, including an overcurrent protection driving circuit, which includes:

a power supply circuit configured to output a direct current voltage;

a switching circuit connected in series between the power supply circuit and a display panel and configured to output or cease outputting the direct current voltage to the display panel according to a switch control signal;

a current feedback circuit configured to convert a voltage signal transmitted from the power supply circuit to the display panel to a current signal and feed the current signal back to a current detection circuit;

the current detection circuit configured to detect a magnitude of the current signal and output a first level signal when a current value corresponding to the current signal is smaller than an overcurrent protection current threshold value; and a level output circuit configured to control the switching-off of the switching circuit according to the first level signal to cut off the supply of power from the power supply circuit to the display panel.

Optionally, a power output terminal of the power supply circuit, a power input terminal of the switching circuit and a signal input terminal of the current feedback circuit are interconnected, a power output terminal of the switching circuit is connected with a power input terminal of the display panel, a signal output terminal of the current feedback circuit is connected with a signal input terminal of the current detection circuit, a signal output terminal of the current detection circuit is connected with a signal output terminal of the level output circuit, and the signal output terminal of the level output circuit is connected with a controlled terminal of the switching circuit.

Optionally, a voltage signal of the current detection circuit and the current signal are in a positive feedback relationship.

Optionally, the switching circuit is in a switched-off state when the power supply circuit is initially powered on.

Optionally, the level output circuit includes a signal latching circuit and a level conversion circuit, a first signal input terminal of the signal latching circuit is connected with the signal output terminal of the current detection circuit, a signal output terminal of the signal latching circuit is connected with a signal input terminal of the level conversion circuit, and a signal output terminal of the level conversion circuit, a control terminal of the switching circuit and a second signal input terminal of the signal latching circuit are interconnected;

the signal latching circuit is configured to output a level signal of the second signal input terminal to the level conversion circuit when the current detection circuit outputs the first level signal; and the level conversion circuit is configured to receive a level signal output by the signal latching circuit and output a reverse level signal to the switching circuit and the second signal input terminal of the signal latching circuit.

Optionally, the signal latching circuit includes a D flip-flop, a clock input terminal of the D flip-flop is connected with the signal output terminal of the current detection circuit, a data input terminal of the D flip-flop, the signal output terminal of the level conversion circuit and the control terminal of the switching circuit are interconnected, and a data output terminal of the D flip-flop is connected with the signal input terminal of the level conversion circuit.

Optionally, the level conversion circuit includes a direct current power supply, a first MOS transistor, a second MOS transistor and a second resistor, the first MOS transistor is a PMOS transistor, and the second MOS transistor is an NMOS transistor;

a gate electrode of the first MOS transistor and that of the second MOS transistor are both connected with the signal output terminal of the signal latching circuit, a source electrode of the first MOS transistor is connected with a power output terminal of the direct current power supply, a drain electrode of the first MOS transistor, that of the second MOS transistor and a first terminal of the second resistor are interconnected, and a source electrode of the second MOS transistor is connected with a second terminal of the second resistor.

Optionally, the current feedback circuit includes a third MOS transistor, which is an NMOS transistor;

a gate electrode of the third MOS transistor is connected with the power output terminal of the power supply circuit, a drain electrode of the third MOS transistor is connected with the signal input terminal of the current detection circuit, and a source electrode of the third MOS transistor is grounded.

Optionally, the switching circuit includes a fourth MOS transistor, which is an NMOS transistor;

a drain electrode of the fourth MOS transistor is connected with the power output terminal of the power supply circuit, a gate electrode of the fourth MOS transistor is connected with the signal output terminal of the level output circuit, and a source electrode of the fourth MOS transistor is connected with the power input terminal of the display panel.

In technical solutions provided herein, an overcurrent protection driving circuit of a display panel consists of a power supply circuit, a switching circuit, a current feedback circuit, a current detection circuit and a level output circuit, the power supply circuit outputs a direct current voltage to the display panel via the switching circuit, at the same time, the current feedback circuit converts a voltage signal transmitted from the power supply circuit to the display panel to a current signal and feeds the current signal back to the current detection circuit, thereby achieving a purpose of measuring a large current with a small current; when a current value corresponding to the current signal is smaller than an overcurrent protection current threshold value, the current detection circuit outputs a first level signal to control the switching-off of the switching circuit to cut off the supply of power from the power supply circuit to the display panel, thus addressing the problem that the generation of a large current when a short circuit occurs in a display panel causes an irreversible damage to a drive circuit or the display panel.

BRIEF DESCRIPTION OF THE DRAWINGS

In order to illustrate the technical schemes in the embodiments of the present disclosure or in the prior art more clearly, the drawings which are required to be used in the description of the embodiments of the present disclosure or the prior art are briefly described below. It is obvious that the drawings described below are only some embodiments of the present disclosure. It is apparent to those of ordinary skill in the art that other drawings may be obtained based on the structures shown in accompanying drawings without inventive effort.

LABELS ILLUSTRATION FOR DRAWINGS

TABLE 1

| Label | Name | Label | Name |
|---|---|---|---|
| 100 | Overcurrent protection driving circuit | R1 | First resistor |
| 200 | display panel | R2 | Second resistor |
| 10 | Power supply circuit | Q1 | First MOS transistor |
| 20 | Switching circuit | Q2 | Second MOS transistor |
| 30 | Current feedback circuit | Q3 | Third MOS transistor |

TABLE 1-continued

| Label | Name | Label | Name |
|---|---|---|---|
| 40 | Current detection circuit | Q4 | Fourth MOS transistor |
| 50 | Level output circuit | D1 | D flip-flop |
| 1000 | Display device | | |

The realizing of the objective, functional characteristics, advantages of the present disclosure are further described in detail with reference to the accompanying drawings when read conjunction with the embodiments.

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure. All other embodiments obtained by persons of ordinary skill in the art based on the embodiments of the present disclosure without creative efforts shall fall within the scope of protection of the present disclosure.

It should be noted that the descriptions, such as the "first", the "second" in the present disclosure, can only be used for describing the aim of description, and cannot be understood as indicating or suggesting relative importance or impliedly indicating the number of the indicated technical features. Therefore, a feature indicated by the "first", the "second" can express or impliedly include at least one of the features. In addition, the meaning of "and/or", which is used throughout the specification, includes three equal solutions, by taking "A/B" as example, the meaning of "A/B" includes a solution A, a solution B or a solution in which solutions A and B are both met; moreover, the technical solutions of different embodiments can be combined with each other on the condition that the combined technical solution can be realized by persons of ordinary skill in the art, when the combination of the technical solutions occurs contradiction or cannot be realized, it should consider that the combination of the technical solutions is impracticable, and is not contained in the scope of protection claimed by the present disclosure.

Figure 1:
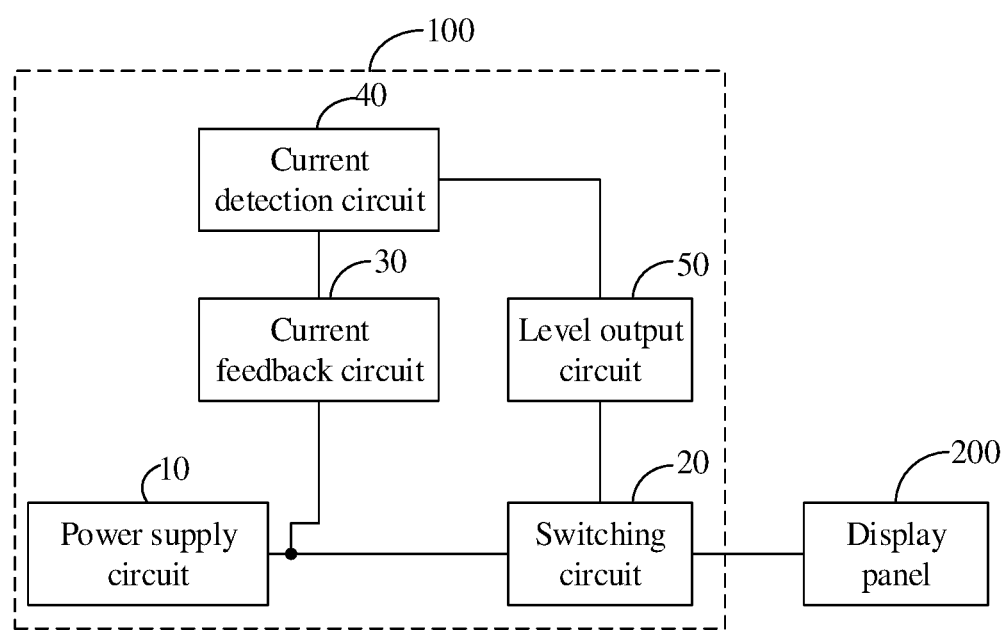
FIG. 1 is a schematic diagram illustrating a modular structure of an embodiment of an overcurrent protection driving circuit according to the present disclosure.
Figure 2:
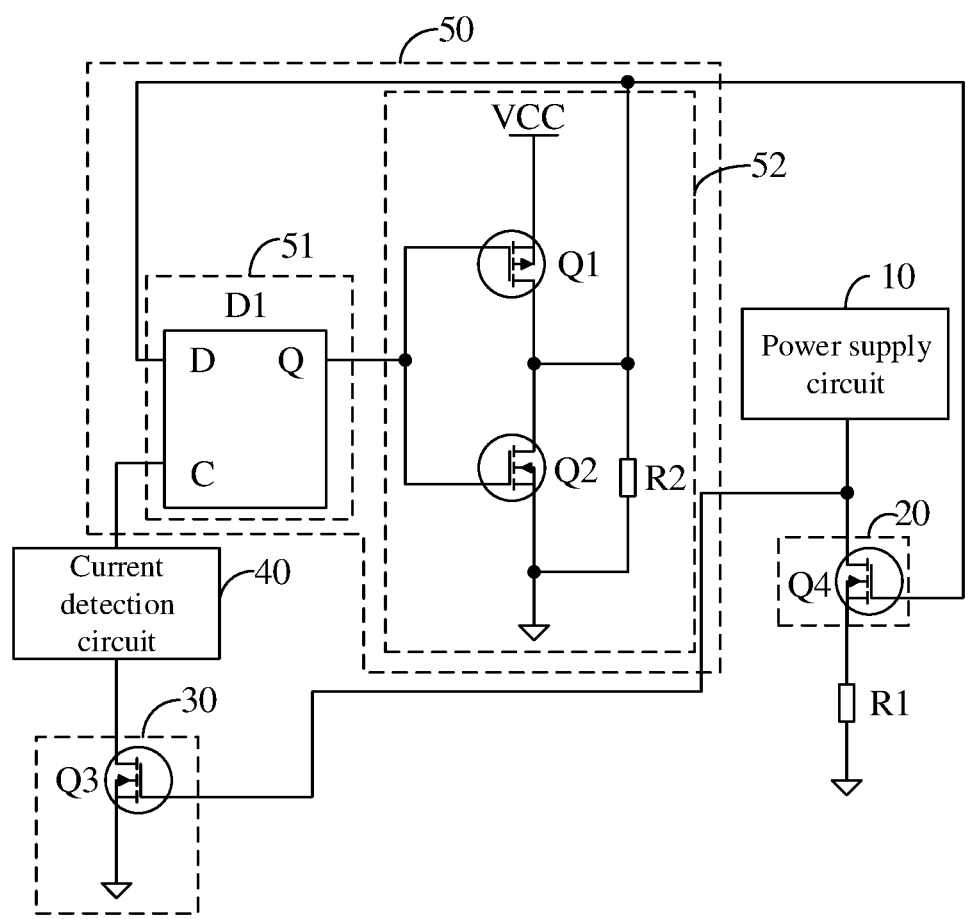
FIG. 2 is a schematic diagram illustrating a circuit structure of another embodiment of an overcurrent protection driving circuit according to the present disclosure.
Figure 3:
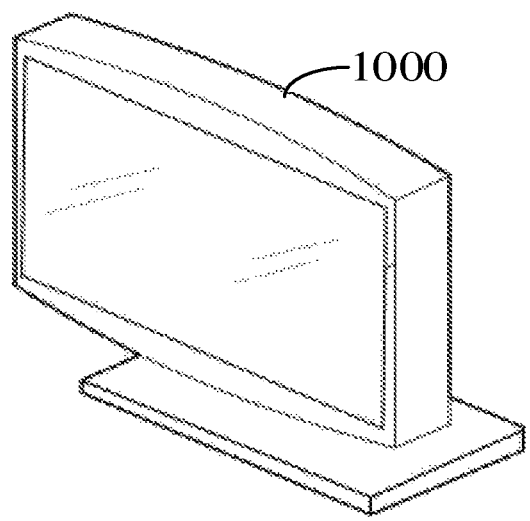
FIG. 3 is a schematic diagram illustrating a structure of an embodiment of a display apparatus according to the present disclosure

An overcurrent protection driving circuit 100 provided herein may be configured to drive an electronic device such as a computer, a television, a mobile phone or the like and realize an overcurrent protection for a display device, referring to FIG. 1 which is a schematic diagram illustrating a modular structure of an embodiment of the overcurrent protection driving circuit 100 according to the present disclosure and FIG. 2 which is a schematic diagram illustrating a circuit structure of another embodiment of the overcurrent protection driving circuit 100 according to the present disclosure, the overcurrent protection driving circuit 100 includes, without limitation, a power supply circuit 10, a switching circuit 20, a current feedback circuit 30, a current detection circuit 40 and a level output circuit 50.

The power supply circuit 10 is configured to output a direct current voltage;

the switching circuit 20 is connected in series between the power supply circuit 10 and the display panel 200 and configured to output or cease outputting the direct current voltage to the display panel 200 according to a switch control signal;

the current feedback circuit 30 is configured to convert a voltage signal transmitted from the power supply circuit 10 to the display panel 200 to a current signal and feed the current signal back to a current detection circuit 40;

the current detection circuit 40 is configured to detect a magnitude of the current signal and output a first level signal when a current value corresponding to the current signal is smaller than an overcurrent protection current threshold value; and the level output circuit 50 is configured to control the switching-off of the switching circuit 20 according to the first level signal to cut off the supply of power from the power supply circuit 10 to the display panel 200.

The display panel 200 includes, without limitation, a display panel such as a liquid crystal display panel, an organic light-emitting diode or the like, a field emission display panel, a plasma display panel, and a curved panel, wherein the liquid crystal panel includes a thin film transistor liquid crystal display, a Twisted Nematic (TN) panel, a Vertical Alignment (VA) panel, an In-Plane Switching panel, and the like.

In an optional embodiment, the power supply circuit 10 may be an independent direct current power supply such as an energy storage battery, or a power conversion circuit connected with an alternating current power supply, which is, for example, a rectifying and filtering circuit, a voltage conversion circuit or a constant-power power supply IC; the power supply circuit 10 is configured to output a constant power to drive the display panel 20, and it can be appreciated that the larger a current output by the power supply circuit 10 is, the smaller a voltage output from the power supply circuit 10 is.

In an optional embodiment, the display panel 200 may be equivalent to a first resistor R1, the switching circuit 20 may be an MOS transistor, a triode or a combinational circuit having functions of a switch, the switching circuit 20 includes a power input terminal, a power output terminal and a controlled terminal, the power input terminal of the switching circuit 20 is connected with a power output terminal of the power supply circuit 10, the controlled terminal of the switching circuit 20 is connected with a signal output terminal of the level output circuit 50, and the power output terminal of the switching circuit 20 is connected with a power input terminal of the first resistor R1.

The switching circuit 20 is in a switched-off state when the power supply circuit 10 is initially powered on, thereby avoiding that the output of a large current to a load when the power supply circuit 10 is initially powered causes an overcurrent damage; when a voltage of the power supply circuit 10 rises to a predetermined voltage, the switching circuit 20 receives a level signal from the level output circuit 50 to be switched on, and the power supply circuit 10 starts driving the load to work, thereby realizing a soft start; when the power supply circuit 10 outputs a large current due to a short circuit of the load or a failure, the switching circuit 20 receives a first level signal output by the level output circuit 50 and is switched off, and a direct current power supply output by the power supply circuit 10 is cut off, thereby realizing an overcurrent protection.

The current feedback circuit 30, which is separately connected with the power output terminal of the power supply circuit 10 and the current detection circuit 40, is configured to convert a voltage signal output from the power supply circuit 10 to a current signal, a voltage of an input terminal of the current feedback circuit 30 and a current of an output terminal of the current feedback circuit 30 are in a positive feedback relationship; when the power supply circuit 10 outputs a large current, the current feedback circuit 30 accordingly inputs a relatively small voltage and outputs a relatively small current, thereby achieving a purpose of measuring a large current with a small current and thus avoiding a damage caused by a direct measurement to the overcurrent protection driving circuit 100.

A signal input terminal of the current detection circuit 40 is connected with a signal output terminal of the current feedback circuit 30; an output terminal of the current detection circuit 40 is connected with the level output circuit 50; the current detection circuit 40 may be a current detection circuit consisting of a single chip microcomputer others components; the current detection circuit 40 includes a detection circuit and a processing circuit, wherein the detection circuit detects a magnitude of a current of the current feedback circuit 30, and the processing circuit compares a received current signal with a preset overcurrent protection current threshold value, and correspondingly outputs the first level signal to the level output circuit 50 when the current signal is smaller than the overcurrent protection current threshold value, that is, when the power supply circuit 10 outputs a large current.

The level output circuit 50, a signal input terminal of which is connected with a signal output terminal of the current detection circuit 40, and a signal output terminal of which is connected with the controlled terminal of the switching circuit 20, is configured to correspondingly output a control signal to the switching circuit 20 according to the first level signal output by the current detection circuit 40 so as to control the switching-off of the switching circuit 20 and consequentially control the cease of an output from the power supply circuit 10 to realize an overcurrent protection.

In technical solutions provided herein, the overcurrent protection driving circuit 100 of the display panel 200 consists of the power supply circuit 10, the switching circuit 20, the current feedback circuit 30, the current detection circuit 40 and the level output circuit 50, the power supply circuit 10 outputs a direct current voltage to the display panel 200 via the switching circuit 20, at the same time, the current feedback circuit 30 converts a voltage signal transmitted from the power supply circuit 10 to the display panel 200 to a current signal and feeds the current signal back to the current detection circuit 40, thereby achieving a purpose of measuring a large current with a small current; when a current value corresponding to the current signal is smaller than an overcurrent protection current threshold value, the current detection circuit 40 outputs a first level signal to control the switching-off of the switching circuit 20 to cut off the supply of power from the power supply circuit 10 to the display panel 200, thus addressing a problem that the generation of a large current when a short circuit occurs in the display panel 200 causes an irreversible damage to a drive circuit or the display panel 200.

In an optional embodiment, the level output terminal 50 includes a signal latching circuit 51 and a level conversion circuit 52, a first signal input terminal of the signal latching circuit 51 is connected with the signal output terminal of the current detection circuit 40, a signal output terminal of the signal latching circuit 51 is connected with a signal input terminal of the level conversion circuit 52, and a signal output terminal of the level conversion circuit 52, a control terminal of the switching circuit 20 and a second signal input terminal of the signal latching circuit 51 are interconnected.

The signal latching circuit 51 is configured to output a level signal of the second signal input terminal to the level conversion circuit 52 when the current detection circuit 40 outputs the first level signal; and the level conversion circuit 52 is configured to receive a level signal output by the signal latching circuit 51 and output a reverse level signal to the switching circuit 20 and the second signal input terminal of the signal latching circuit 51.

In an optional embodiment, the signal latching circuit 51 changes an output state thereof under the effect of a specific input pulse level, which includes, without limitation, a high-level signal or a rising edge signal; the first signal input terminal of the signal latching circuit 51 is an enabling terminal, the second signal input terminal of the signal latching circuit 51 is a signal input terminal; the signal latching circuit 51 assigns a value of a level signal of the first signal input terminal to an output terminal only when the first signal input terminal receives a high level or a rising edge signal; the output terminal of the signal latching circuit 51 is not changed in state with the input terminal of the signal latching circuit 51; after receiving a level signal output by the signal latching circuit 51, the level conversion circuit 52 converts and inverts the level signal so that the level signal at the input terminal of the signal latching circuit 51 is in a state opposite to the previous state of the level signal, thereby guaranteeing a stable output of a control signal from the level output circuit 50 to the switching circuit to switch on/off the switching circuit 20 reliably.

In an optional embodiment, the signal latching circuit includes a D flip-flop D1, wherein a clock input terminal of the D flip-flop D1 is connected with the signal output terminal of the current detection circuit 40, a data input terminal of the D flip-flop D1, the signal output terminal of the level conversion circuit 52 and the control terminal of the switching circuit 20 are interconnected, and a data output terminal of the D flip-flop D1 is connected with the signal input terminal of the level conversion circuit 52.

Having two stable states: "1" and "0", the D flip-flop D1 can be switched from one stable state to the other stable state under the effect of a certain external signal, the state of the D flip-flop D1 switches at a leading edge of a clock pulse signal, the next state of the flip-flop depends on a state in which the data input terminal D is prior to the arrival of a rising edge of a pulse; when an abnormally large current is generated in the display panel 200, the current detection circuit 40 detects that a current signal output by the current feedback circuit 30 is smaller than an overcurrent protection threshold value, the current detection circuit 40 outputs a rising edge of a pulse signal to a clock input terminal C of the D flip-flop D1, at this time, the D flip-flop D1 outputs a high level of the data input terminal to a data output terminal Q, moreover, the level conversion circuit 52 converts the high level to a low level and outputs the low level to the switching circuit 20 and the data input terminal D to control the switching-off of the switching circuit 20 and re-perform a value assignment on the data input terminal D to help the D flip-flop D2 switch to the next state and realize an overcurrent protection for the display panel 200.

In an optional embodiment, the level conversion circuit 52 includes a direct current power supply, a first MOS transistor Q1, a second MOS transistor Q2 and a second resistor R2, wherein the first MOS transistor Q1 is a PMOS transistor, and the second MOS transistor Q2 is an NMOS transistor;

a gate electrode of the first MOS transistor Q1 and that of the second MOS transistor Q2 are both connected with the signal output terminal of the signal latching circuit 51, a source electrode of the first MOS transistor Q1 is connected with a power output terminal of the direct current power supply, a drain electrode of the first MOS transistor Q1, that of the second MOS transistor Q2 and a first terminal of the second resistor R2 are interconnected, and a source electrode of the second MOS transistor Q2 is connected with a second terminal of the second resistor R2.

In the embodiment, the first MOS transistor Q1, which is a PMOS transistor, is switched on when a gate control signal is a low level and switched off when the gate control signal is a high level, and a source electrode of the first MOS transistor Q1 is connected with the direct current power supply, which is equivalent to a high-level signal "1"; the second MOS transistor Q2, which is an NMOS transistor, is switched on when the gate control signal is a high level and switched off when the gate control signal is a low level, and a source electrode of the second MOS transistor Q2 is grounded, an earth pole is equivalent to a low-level signal "0"; when the D flip-flop D1 outputs a high level, the second MOS transistor Q2 is switched on; when the level conversion circuit outputs a low level, the switching circuit 20 is switched off, and the D flip-flop D1 is re-assigned with a low level; when the D flip-flop D1 receives a rising edge of a pulse signal again, the data output terminal Q of the D flip-flop D1 outputs a level signal of the data input terminal D, that is, a low level, at this time, the first MOS transistor Q1 is switched on, the level conversion circuit 52 outputs a high level, the switching circuit 20 is switched on, and the data input terminal of the D flip-flop D1 is re-assigned with a high level.

In an optional embodiment, the current feedback circuit 30 includes a third MOS transistor Q3, which is an NMOS transistor;

a gate electrode of the third MOS transistor Q3 is connected with the power output terminal of the power supply circuit 10, a drain electrode of the third MOS transistor Q3 is connected with the signal input terminal of the current detection circuit 40, and a source electrode of the third MOS transistor Q3 is grounded.

In the embodiment, according to the current feature of an MOS transistor, that is, according to a principle that the magnitude of a current is controlled according to the magnitude of a gate voltage, the larger a gate voltage of an MOS transistor is, the large a current flowing through the MOS transistor is, and vice verse; the third MOS transistor Q3, the gate electrode of which is connected with the power output terminal of the power supply circuit 10, is conductive when the power supply circuit 10 is switched on, a current of the third MOS transistor Q3 changes with an output voltage of the power supply circuit 10 to realize a conversion from a voltage signal to a current signal, thereby realizing a positive feedback, whereas the current of the third MOS transistor Q3 is inversely proportional to a current output from the power supply circuit 10, thus realizing a purpose of detecting a large current with a small current when an overcurrent appears in the display panel 200; the current detection circuit 40 detects the magnitude of the current of the third MOS tub Q3 in real time and compares the detected current with a predetermined overcurrent protection threshold value, which is set to, for example, 10 mA, when an overcurrent appears in the display panel 200, a voltage output from the power supply circuit 10 decreases until the current detection circuit 40 detects that the current of the third MOS transistor Q3 is smaller than 10 mA, then, the current detection circuit 40 outputs a rising edge of a pulse signal, the D flip-flop D1 outputs a high level to the first MOS transistor Q1 and the second MOS transistor Q2 to switch off the first MOS transistor Q1 and switch on the second MOS transistor Q2, and the level output circuit 50 outputs a low level to the switching circuit 20, thereby controlling the power supply circuit 10 to cease outputting a direct current power supply to the display panel 200 to realize a protection for the display panel 200.

In an optional embodiment, the switching circuit 20 includes a fourth MOS transistor, which is an NMOS transistor;

a drain electrode of the fourth MOS transistor Q4 is connected with the power output terminal of the power supply circuit 10, a gate electrode of the fourth MOS transistor Q4 is connected with the signal output terminal of the level output circuit 50, and a source electrode of the fourth MOS transistor Q4 is connected with the power input terminal of the display panel 200.

The fourth MOS transistor Q4, a gate electrode of which is connected with the signal output terminal of the level output circuit 50, is switched on in the case of a high level and switched off in the case of a low level; when the power supply circuit 10 is initially powered on, the gate electrode of the fourth MOS transistor Q4 is grounded via the second resistor R2 to keep the fourth MOS transistor Q4 switched off, thereby avoiding that the display panel 200 is damaged by an overcurrent generated when the power supply circuit 10 is powered on; after the power supply circuit 10 functions normally, an output voltage of the power supply rises, the current of the third MOS transistor Q3 increases, when the current of the third MOS transistor Q3 is larger than a predetermined current of the current detection circuit 40, the current detection circuit 40 outputs a rising edge of a pulse signal to the clock input terminal C of the D flip-flop D1, at this time, the data input terminal D of the D flip-flop D1 is at a low level; when receiving a rising edge of a pulse, the D flip-flop D1 assigns the low level of the data input terminal D to the data output terminal Q, in this case, the first MOS transistor Q1 is switched on, the second MOS transistor Q2 is switched off, that is, the gate electrode of the fourth MOS transistor Q4 is switched on in the case of a high level, the power supply circuit 10 is connected with the display panel 200, and the display panel 20 functions normally.

When an abnormally large current appears at the load end or is caused by an abnormal short circuit, a current flowing through the first resistor R1 increases, and a voltage of an output terminal of the power supply circuit 10 drops, in this case, the grid electrode of the third MOS transistor Q3 drops, and the current flowing through the third MOS transistor Q3 decreases; when the current is lower than the overcurrent protection threshold value, which is, for example, 10 mA, the current detection circuit 40 outputs a pulse to the clock input terminal C of the D flip-flop D1, the data input terminal D of the D flip-flop D1 is H at this time; when receiving a rising edge of the pulse, the D flip-flop D1 assigns the L value of the data input terminal D to the data output terminal Q, at this time, the second MOS transistor Q2 is switched on, the first MOS transistor Q1 is switched off, that is, the gate control signal of the fourth MOS transistor Q4 is a low level, in this case, the fourth MOS transistor Q4 is switched off, the power supply circuit 10 is disconnected with the load end, and the display panel 200 stops functioning, thus avoiding a damage caused by a continuous large current to the display panel 200 and a driving system.

The present disclosure also provides an overcurrent protection driving circuit 100, including:

a power supply circuit 10 configured to output a direct current voltage to a display panel 200 via a switching circuit 20;

a third MOS transistor Q3, a D flip-flop D1, a direct current power supply, a first MOS transistor Q1, a second MOS transistor Q2 and a second resistor R2, wherein a gate electrode of the third MOS transistor Q3 is connected with a power output terminal of the power supply circuit 10, a drain electrode of the third MOS transistor Q3 is connected with a signal input terminal of a current detection circuit 40, and a source electrode of the third MOS transistor Q3 is grounded;

a clock input terminal of the D flip-flop D1 is connected with a signal output terminal of the current detection circuit 40, a data input terminal of the D flip-flop D1, a drain electrode of the first MOS transistor Q1, a drain electrode of the second MOS transistor, a first terminal of the second resistor R2 and a controlled terminal of the switching circuit 20 are interconnected, a data output terminal of the D flip-flop D1, a gate electrode of the first MOS transistor Q1 and a gate electrode of the second MOS transistor Q2 are interconnected, a source electrode of the first MOS transistor Q1 is connected with a power output terminal of the direct current power supply, and a source electrode of the second MOS transistor Q2 is connected with a second terminal of the second resistor R2;

the third MOS transistor Q3 is configured to convert a voltage signal transmitted from the power supply circuit 10 to the display panel 200 to a current signal and feed the current signal back to the current detection circuit 40; and the current detection circuit 40 configured to detect a magnitude of the current signal and output, when a current value corresponding to the current signal is smaller than an overcurrent protection current threshold value, a first level signal to the clock input terminal of the D flip-flop D1 to trigger the D flip-flop D1 to output a triggering signal to control the switching-off of the first MOS transistor Q1 and the switching-on of the second MOS transistor Q2, wherein the second MOS transistor Q2 outputs a grounding signal to control the switching-off of the switching circuit 20 to cut off the supply of power from the power supply circuit 10 to the display panel 200.

The present disclosure further provides a display apparatus 1000, which includes the foregoing overcurrent protection driving circuit 100, a specific structure of which can be understood with reference to the foregoing embodiments; adopting all the technical solutions of all the foregoing embodiments, the display apparatus 1000 at least has all the technical effects achieved by the technical solutions of the foregoing embodiments and is therefore not described here redundantly.

The embodiments above are merely preferably embodiments of the present disclosure but are not to be construed as limiting the patent scope of the present disclosure, and any equivalent structural conversion devised based on the inventive concept of the present disclosure or using the drawing of the present disclosure, or a direct or indirect application of the present disclosure to another related technical field shall fall into the scope of protection of the present disclosure.

What is claimed is:

1. An overcurrent protection driving circuit, comprising: a power supply circuit configured to output a direct current voltage; a switching circuit connected in series between the power supply circuit and a display panel and configured to output or cease outputting the direct current voltage to the display panel according to a switch control signal; a current feedback circuit configured to convert a voltage signal transmitted from the power supply circuit to the display panel to a current signal and feed the current signal back to a current detection circuit; the current detection circuit configured to detect a magnitude of the current signal and output a first level signal when a current value corresponding to the current signal is smaller than an overcurrent protection current threshold value; and a level output circuit configured to control the switching-off of the switching circuit according to the first level signal to cut off the supply of power from the power supply circuit to the display panel, wherein the level output circuit comprises a signal latching circuit and a level conversion circuit, a first signal input terminal of the signal latching circuit is connected with a signal output terminal of the current detection circuit, a signal output terminal of the signal latching circuit is connected with a signal input terminal of the level conversion circuit, and a signal output terminal of the level conversion circuit, a control terminal of the switching circuit and a second signal input terminal of the signal latching circuit are directly interconnected; when the current detection circuit outputs the first level signal, the signal latching circuit is configured to output the first level signal to the level conversion circuit at the signal output terminal; and the level conversion circuit is configured to receive the first level signal output by the signal latching circuit and output a reverse level signal to the switching circuit and the second signal input terminal of the signal latching circuit, wherein the first level signal is a high level signal or a rise edge signal, and the reverse level signal is a low level signal or a falling edge signal.

2. The overcurrent protection driving circuit according to claim 1, wherein a power output terminal of the power supply circuit, a power input terminal of the switching circuit and a signal input terminal of the current feedback circuit are interconnected, a power output terminal of the switching circuit is connected with a power input terminal of the display panel, a signal output terminal of the current feedback circuit is connected with a signal input terminal of the current detection circuit, the signal output terminal of the current detection circuit is connected with a signal input terminal of the level output circuit, and the signal output terminal of the level output circuit is connected with a controlled terminal of the switching circuit.

3. The overcurrent protection driving circuit according to claim 2, wherein a voltage signal of the current detection circuit and the current signal are in a positive feedback relationship.

4. The overcurrent protection driving circuit according to claim 1, wherein the switching circuit is in a switched-off state when the power supply circuit is initially powered on.

5. The overcurrent protection driving circuit according to claim 1, wherein the signal latching circuit comprises a D flip-flop, a clock input terminal of the D flip-flop is connected with the signal output terminal of the current detection circuit, a data input terminal of the D flip-flop, the signal output terminal of the level conversion circuit and the control terminal of the switching circuit are interconnected, and a data output terminal of the D flip-flop is connected with the signal input terminal of the level conversion circuit.

6. The overcurrent protection driving circuit according to claim 1, wherein the level conversion circuit comprises a direct current power supply, a first MOS transistor, a second MOS transistor and a second resistor, the first MOS transistor is a PMOS transistor, and the second MOS transistor is an NMOS transistor;

a gate electrode of the first MOS transistor and that of the second MOS transistor are both connected with the signal output terminal of the signal latching circuit, a source electrode of the first MOS transistor is connected with a power output terminal of the direct current power supply, a drain electrode of the first MOS transistor, that of the second MOS transistor and a first terminal of the second resistor are interconnected, and a source electrode of the second MOS transistor is connected with a second terminal of the second resistor.

7. The overcurrent protection driving circuit according to claim 6, wherein the current feedback circuit comprises a third MOS transistor, which is an NMOS transistor;

a gate electrode of the third MOS transistor is connected with the power output terminal of the power supply circuit, a drain electrode of the third MOS transistor is connected with the signal input terminal of the current detection circuit, and a source electrode of the third MOS transistor is grounded.

8. The overcurrent protection driving circuit according to claim 7, wherein the switching circuit comprises a fourth MOS transistor, which is an NMOS transistor;

a drain electrode of the fourth MOS transistor is connected with the power output terminal of the power supply circuit, a gate electrode of the fourth MOS transistor is connected with the signal output terminal of the level output circuit, and a source electrode of the fourth MOS transistor is connected with the power input terminal of the display panel.

9. The overcurrent protection driving circuit according to claim 1, wherein the power supply circuit is a power supply circuit with constant power.

10. An overcurrent protection driving circuit, comprising:
a power supply circuit configured to output a direct current voltage to a display panel via a switching circuit;
a third MOS transistor, a D flip-flop, a direct current power supply, a first MOS transistor, a second MOS transistor and a second resistor, wherein a gate electrode of the third MOS transistor is connected with a power output terminal of the power supply circuit, a drain electrode of the third MOS transistor is connected with a signal input terminal of a current detection circuit, and a source electrode of the third MOS transistor is grounded;
a clock input terminal of the D flip-flop is connected with a signal output terminal of the current detection circuit, a data input terminal of the D flip-flop, a drain electrode of the first MOS transistor, a drain electrode of the second MOS transistor, a first terminal of the second resistor and a controlled terminal of the switching circuit are interconnected, a data output terminal of the D flip-flop, a gate electrode of the first MOS transistor and a gate electrode of the second MOS transistor are interconnected, a source electrode of the first MOS transistor is connected with a power output terminal of the direct current power supply, and a source electrode of the second MOS transistor is connected with a second terminal of the second resistor;
the third MOS transistor is configured to convert a voltage signal transmitted by the power supply circuit to the display panel to a current signal and feed the current signal back to the current detection circuit; and
the current detection circuit configured to detect a magnitude of the current signal and output, when a current value corresponding to the current signal is smaller than an overcurrent protection current threshold value, a first level signal to the clock input terminal of the D flip-flop to trigger the D flip-flop to output a triggering signal to control the switching-off of the first MOS transistor and the switching-on of the second MOS transistor, wherein the second MOS transistor outputs a grounding signal to control the switching-off of the switching circuit to cut off a power supply conveyed by the power supply circuit to the display panel.

11. A display apparatus, comprising: an overcurrent protection driving circuit, which comprises: a power supply circuit configured to output a direct current voltage; a switching circuit connected in series between the power supply circuit and a display panel and configured to output or cease outputting the direct current voltage to the display panel according to a switch control signal; a current feedback circuit configured to convert a voltage signal transmitted from the power supply circuit to the display panel to a current signal and feed the current signal back to a current detection circuit; the current detection circuit configured to detect a magnitude of the current signal and output a first level signal when a current value corresponding to the current signal is smaller than an overcurrent protection current threshold value; and a level output circuit configured to control the switching-off of the switching circuit according to the first level signal to cut off the supply of power from the power supply circuit to the display panel, wherein the level output circuit comprises a signal latching circuit and a level conversion circuit, a first signal input terminal of the signal latching circuit is connected with a signal output terminal of the current detection circuit, a signal output terminal of the signal latching circuit is connected with a signal input terminal of the level conversion circuit, and a signal output terminal of the level conversion circuit, a control terminal of the switching circuit and a second signal input terminal of the signal latching circuit are directly interconnected; when the current detection circuit outputs the first level signal, the signal latching circuit is configured to output the first level signal to the level conversion circuit at the signal output terminal; and the level conversion circuit is configured to receive the first level signal output by the signal latching circuit and output a reverse level signal to the switching circuit and the second signal input terminal of the signal latching circuit, wherein the first level signal is a high level signal or a rise edge signal, and the reverse level signal is a low level signal or a falling edge signal.

12. The display apparatus according to claim 1, wherein a power output terminal of the power supply circuit, a power input terminal of the switching circuit and a signal input terminal of the current feedback circuit are interconnected, a power output terminal of the switching circuit is connected with a power input terminal of the display panel, a signal output terminal of the current feedback circuit is connected with a signal input terminal of the current detection circuit, the signal output terminal of the current detection circuit is connected with a signal input terminal of the level output circuit, and the signal output terminal of the level output circuit is connected with a controlled terminal of the switching circuit.

13. The display apparatus according to claim 12, wherein a voltage signal of the current detection circuit and the current signal are in a positive feedback relationship.

14. The display apparatus according to claim 11, wherein the switching circuit is in a switched-off state when the power supply circuit is initially powered on.

15. The display apparatus according to claim 11, wherein the signal latching circuit comprises a D flip-flop, a clock input terminal of the D flip-flop is connected with the signal output terminal of the current detection circuit, a data input terminal of the D flip-flop, the signal output terminal of the level conversion circuit and the control terminal of the switching circuit are interconnected, and a data output terminal of the D flip-flop is connected with the signal input terminal of the level conversion circuit.

16. The display apparatus according to claim 11, wherein the level conversion circuit comprises a direct current power supply, a first MOS transistor, a second MOS transistor and a second resistor, the first MOS transistor is a PMOS transistor, and the second MOS transistor is an NMOS transistor;

a gate electrode of the first MOS transistor and that of the second MOS transistor are both connected with the signal output terminal of the signal latching circuit, a source electrode of the first MOS transistor is connected with a power output terminal of the direct current power supply, a drain electrode of the first MOS transistor, that of the second MOS transistor and a first terminal of the second resistor are interconnected, and a source electrode of the second MOS transistor is connected with a second terminal of the second resistor.

17. The display apparatus according to claim 16, wherein the current feedback circuit comprises a third MOS transistor, which is an NMOS transistor, a gate electrode of the third MOS transistor is connected with the power output terminal of the power supply circuit, a drain electrode of the third MOS transistor is connected with the signal input terminal of the current detection circuit, and a source electrode of the third MOS transistor is grounded.

18. The display apparatus according to claim 17, wherein the switching circuit comprises a fourth MOS transistor, which is an NMOS transistor;

a drain electrode of the fourth MOS transistor is connected with the power output terminal of the power supply circuit, a gate electrode of the fourth MOS transistor is connected with the signal output terminal of the level output circuit, and a source electrode of the fourth MOS transistor is connected with the power input terminal of the display panel.

* * * * *